US009533561B2

(12) United States Patent
Murata

(10) Patent No.: US 9,533,561 B2
(45) Date of Patent: Jan. 3, 2017

(54) POWER TRANSMISSION DEVICE

(75) Inventor: Kiyohito Murata, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 434 days.

(21) Appl. No.: 13/516,832

(22) PCT Filed: Dec. 17, 2009

(86) PCT No.: PCT/JP2009/006991
§ 371 (c)(1),
(2), (4) Date: Jun. 18, 2012

(87) PCT Pub. No.: WO2011/074042
PCT Pub. Date: Jun. 23, 2011

(65) Prior Publication Data
US 2012/0255396 A1 Oct. 11, 2012

(51) Int. Cl.
B60K 6/36 (2007.10)
B60K 6/445 (2007.10)
(Continued)

(52) U.S. Cl.
CPC .............. B60K 6/36 (2013.01); B60K 6/445 (2013.01); F16H 57/0006 (2013.01);
(Continued)

(58) Field of Classification Search
CPC ................................ B60K 6/36; F16H 57/0006
(Continued)

(56) References Cited

U.S. PATENT DOCUMENTS 1,735,229 A * 11/1929 Baker ..................... F02P 7/10
74/443
2,961,856 A * 11/1960 Selzer ..................... F16D 3/68
105/131
(Continued)

FOREIGN PATENT DOCUMENTS

JP 61 191555 11/1986
JP 11 325185 11/1999
(Continued)

OTHER PUBLICATIONS

International Search Report Issued Mar. 23, 2010 in PCT/JP09/06991 Filed Dec. 17, 2009.

Primary Examiner — William C Joyce
(74) Attorney, Agent, or Firm — Oblon, McClelland, Maier & Neustadt, L.L.P.

(57) ABSTRACT

A power transmission device includes a transmission mechanism configured to transmit power generated by an electric motor to an output shaft, to which power generated by an internal combustion engine is transmitted, via engaging sections of a plurality of rotating members, and the transmission mechanism has a play to the engaging sections along a rotating direction, the play being larger than a relative displacement amount between the rotating member on the internal combustion engine side and the rotating member on the electric motor side when a rotation variation phase difference between the internal combustion engine and the electric motor is maximum. Therefore, there can be provided the power transmission device capable of suppressing an occurrence of noise.

12 Claims, 14 Drawing Sheets

(51) Int. Cl.
*F16H 57/00* (2012.01)
*F16H 37/08* (2006.01)

(52) U.S. Cl.
CPC ... *F16H 2037/0866* (2013.01); *Y02T 10/6239* (2013.01); *Y10T 74/19014* (2015.01)

(58) Field of Classification Search
USPC ... 74/661, 665 A, 665 B; 180/65.235, 65.26, 180/65.285, 65.31, 65.6; 475/5
See application file for complete search history.

(56) References Cited

U.S. PATENT DOCUMENTS

| | | | | |
|---|---|---|---|---|
| 5,643,119 | A * | 7/1997 | Yamaguchi et al. | 475/5 |
| 6,692,394 | B2 * | 2/2004 | Takenaka | 475/5 |
| 7,175,555 | B2 * | 2/2007 | Kozarekar et al. | 475/5 |

FOREIGN PATENT DOCUMENTS

| | | |
|---|---|---|
| JP | 2004 34874 | 2/2004 |
| JP | 2005 61487 | 3/2005 |
| JP | 2005 351381 | 12/2005 |
| JP | 2007 198445 | 8/2007 |

\* cited by examiner

POWER TRANSMISSION DEVICE

FIELD

The present invention relates to a power transmission device.

BACKGROUND

As a conventional power transmission device mounted on a vehicle and the like, for example, Patent Literature 1 discloses a power transmission device which is applied to a hybrid vehicle including both an internal combustion engine and an electric motor as power sources for travelling and has a first gear to which a drive force is input and a second gear which is meshed with the first gear in a state that it has a predetermined backlash and transmits the drive force to a load. When there is predicted an occurrence of collision between tooth surfaces due to a mesh between a first gear provided with a permanent magnet and a second gear provided with a coil disposed at a position where a magnetic flux from the permanent magnet links, the power transmission device reduces gear noise caused by a gear-tooth hammering shock without increasing a size of the device by controlling a current flowing to the coil by a control means so that the coil generates a flux linkage for suppressing a change of an interlinkage magnetic flux from the permanent magnet due to a change of an inter-tooth-surface relative distance.

CITATION LIST

Patent Literature

Patent Literature 1: Japanese Patent Application Laid-open No. 2005-061487

SUMMARY

Technical Problem

Incidentally, since the power transmission device described in Patent Literature 1 as described above has a possibility, for example, that a structure becomes complicated and fuel economy becomes bad because electric power is necessary to suppress gear-tooth hammering noise, it is desired to more appropriately suppress noise.

Accordingly, an object of the present invention is to provide a power transmission device which can suppress generation of noise.

Solution to Problem

In order to achieve the above mentioned object, a power transmission device according to the present invention includes a transmission mechanism configured to transmit power generated by an electric motor to an output shaft, to which power generated by an internal combustion engine is transmitted, via engaging sections of a plurality of rotating members, wherein the transmission mechanism has a play to the engaging sections along a rotating direction of the rotating members, the play being larger than a relative displacement amount between the rotating member on the internal combustion engine side and the rotating member on the electric motor side when a rotation variation phase difference between the internal combustion engine and the electric motor is maximum.

Further, in the power transmission device, the transmission mechanism may be configured to include, as the plurality of the rotating members, a first gear disposed to the output shaft and to which power generated by the internal combustion engine is transmitted, an intermediate rotating member disposed with a second gear that is meshed with the first gear and capable of transmitting power generated by the electric motor to the first gear, and an electric motor side rotating member disposed between the intermediate rotating member and the electric motor, and the play may include a backlash formed to the engaging section of the first gear and the second gear, and a rotating direction clearance along the rotating direction formed by a clearance forming section disposed to the engaging section of the intermediate rotating member and the electric motor side rotating member.

Further, the power transmission device may further includes a resistance applying mechanism configured to apply a resistance to the intermediate rotating member along the rotating direction.

Further, in the power transmission device, the clearance forming section may include a vibration absorbing member disposed between the intermediate rotating member and the electric motor side rotating member in the rotating direction.

Further, in the power transmission device, the vibration absorbing member may include a plurality of the vibration absorbing members having a different elastic modulus.

Further, in the power transmission device, the plurality of the vibration absorbing members may be configured such that, as a relative angle between the intermediate rotating member and the electric motor side rotating member increases, the vibration absorbing member having a low elastic modulus is exerted to the intermediate rotating member and the electric motor side rotating member prior to the vibration absorbing member having a high elastic modulus.

Further, in the power transmission device, it is preferable that an inertial mass of the intermediate rotating member is smaller than an inertial mass of the electric motor side rotating member.

Further, the power transmission device may further includes a control device configured to control the electric motor and generates minute control torque for rotating the electric motor in synchronization with the output shaft, when a vehicle, on which the electric motor and the internal combustion engine are mounted as power sources for travelling, is driven without depending on power of the electric motor.

Advantageous Effects of Invention

According to the power transmission device according to the present invention, since the engaging sections of the transmission mechanism have the play along the rotating direction, which is larger than the relative displacement amount between the rotating member on the internal combustion engine side and the rotating member on the electric motor side when the rotation variation phase difference between the internal combustion engine and the electric motor is maximum, the power transmission device can suppress, for example, an occurrence of noise caused by a variation component of the power from the internal combustion engine by the engaging sections.

DESCRIPTION OF EMBODIMENTS

Exemplary embodiments of a power transmission device according to the present invention will be explained below in detail based on the drawings. Note that the present invention is by no means limited by the exemplary embodiments. Further, components in the exemplary embodiments include components that can be replaced by a person skilled in the art as well as are easy or include substantially same components.

First Embodiment

Figure 1:
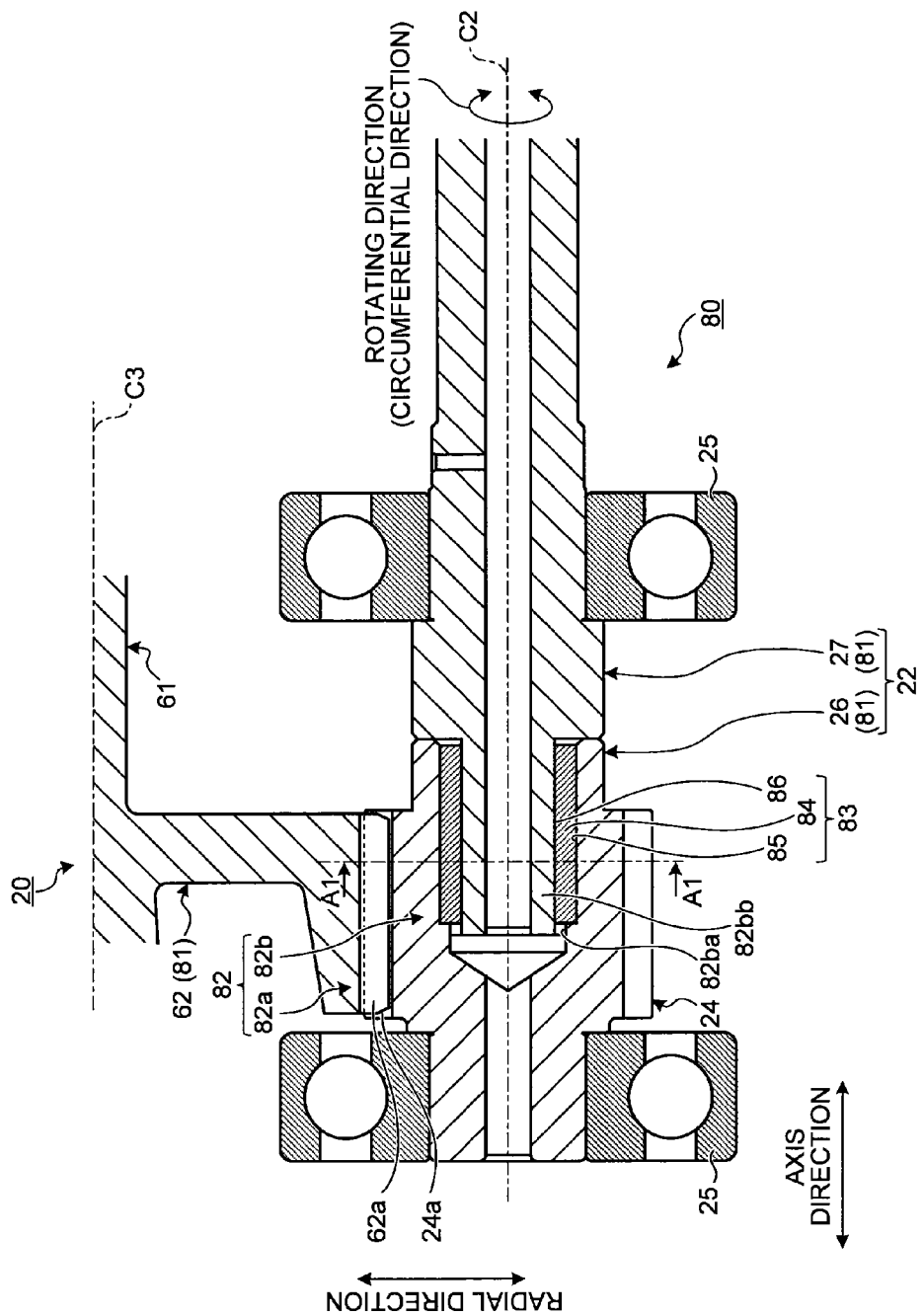
FIG. 1 is a partial sectional view illustrating a schematic configuration in a periphery of a clearance forming section of a power transmission device according to a first embodiment.
Figure 2:
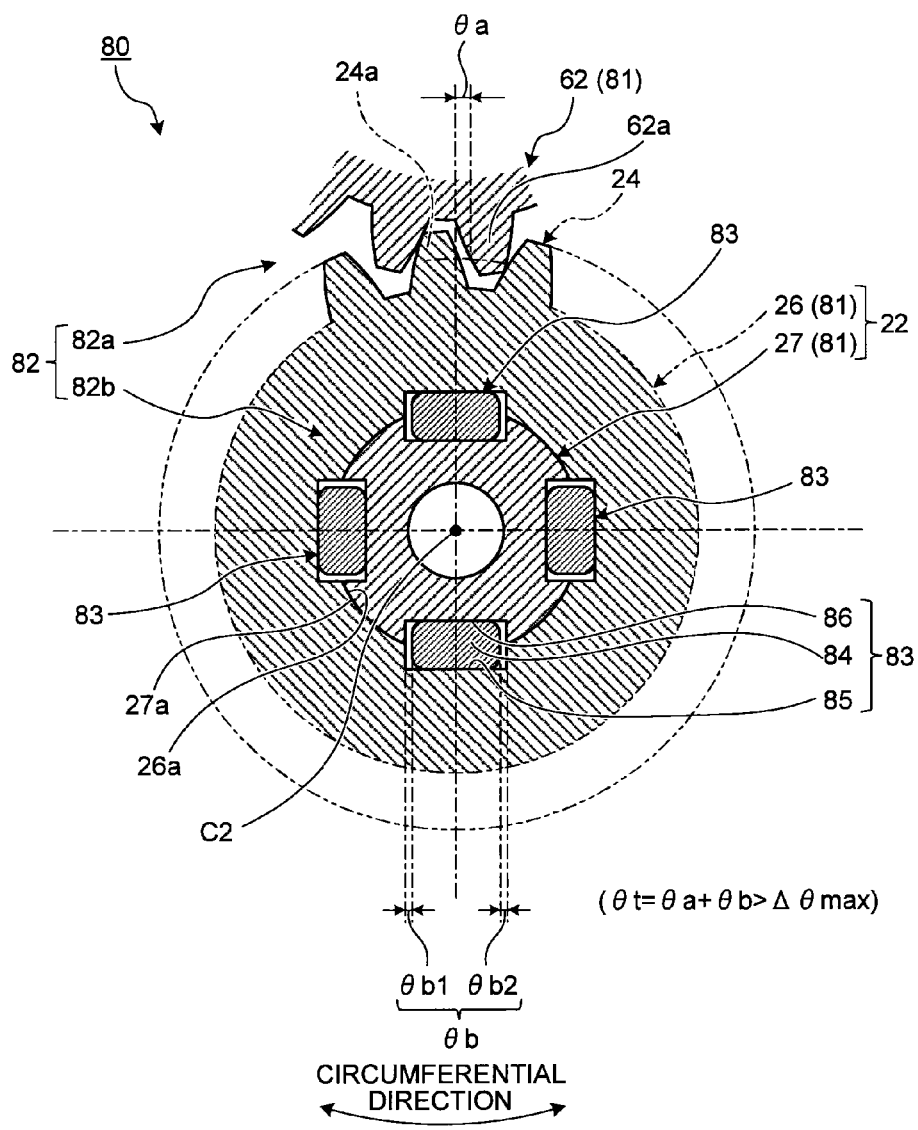
FIG. 2 is a sectional view of the power transmission device taken along line A1-A1 of FIG. 1.
Figure 3:
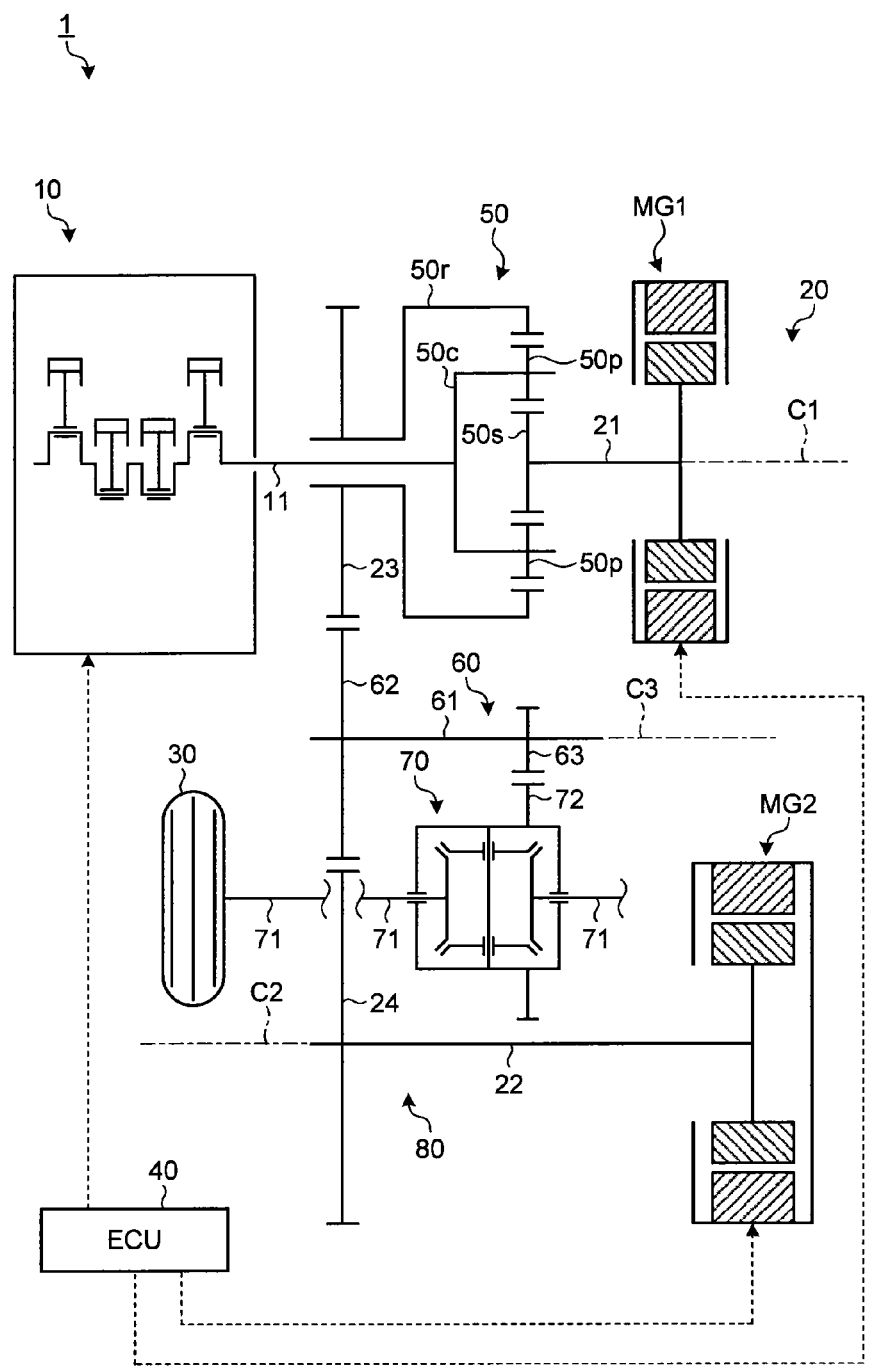
FIG. 3 is a schematic view illustrating a schematic configuration of a vehicle according to the first embodiment.
Figure 4:
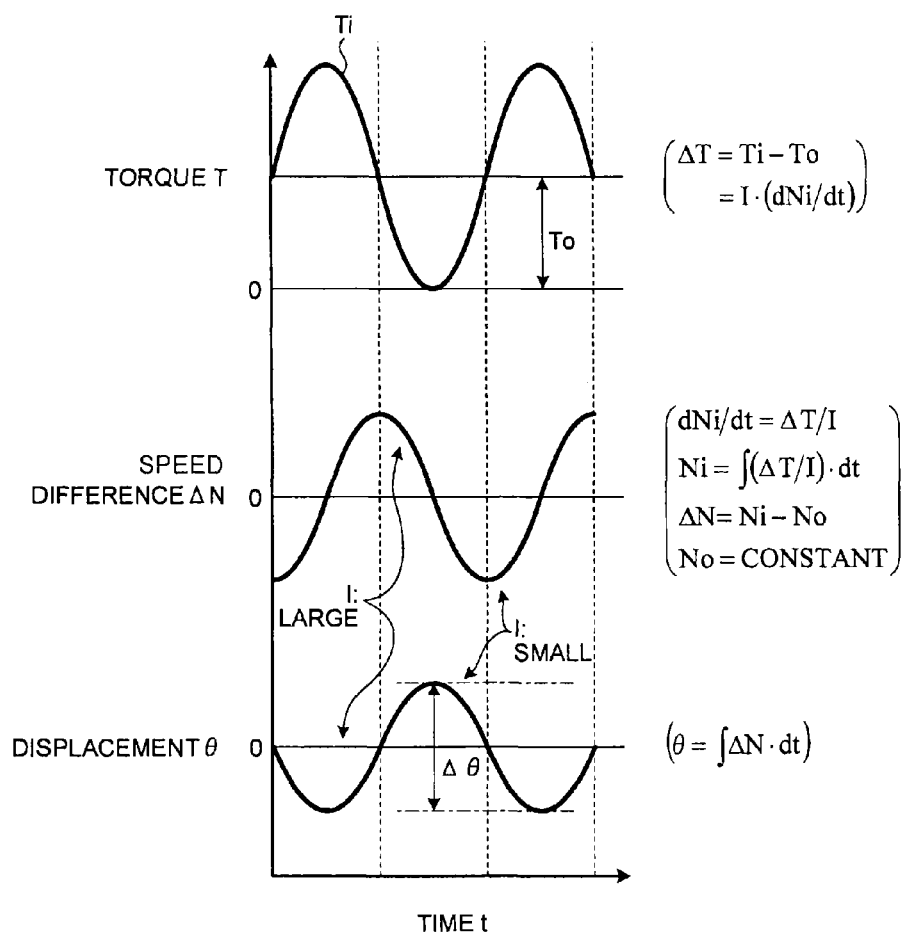
FIG. 4 is a graph explaining power generated by an internal combustion engine according to the first embodiment.
Figure 5:
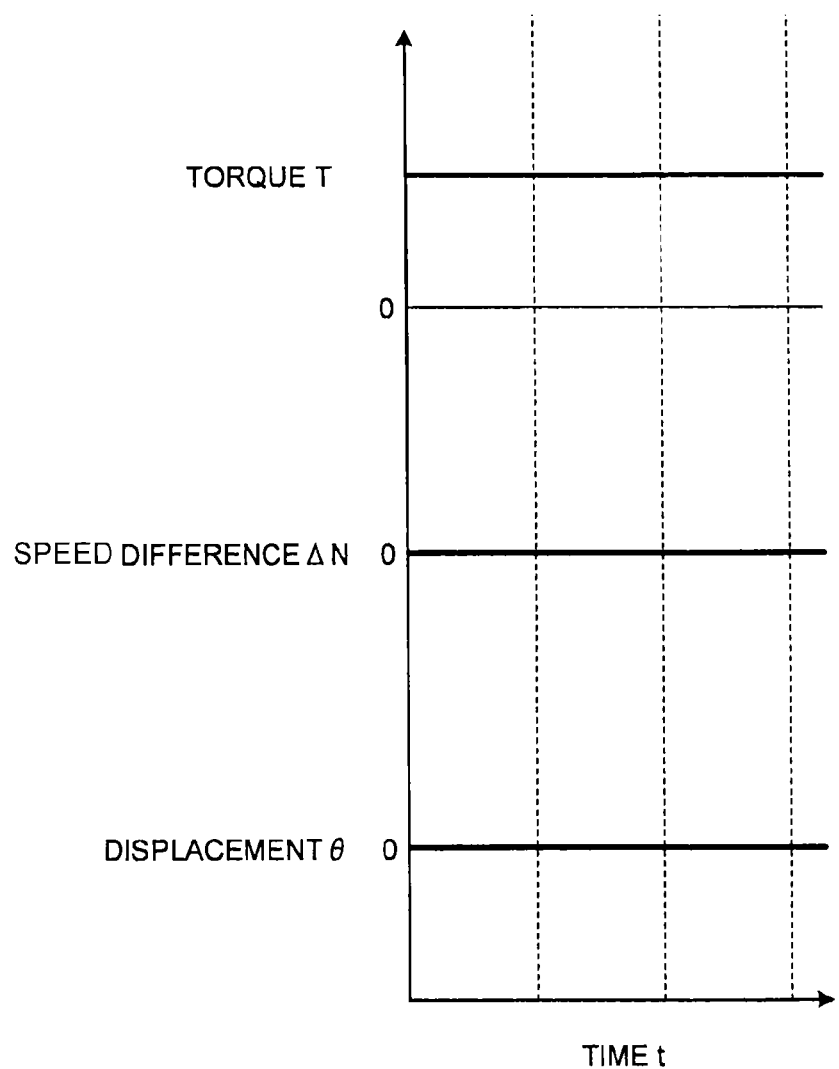
FIG. 5 is a graph explaining power generated by a motor according to the first embodiment.
Figure 6:
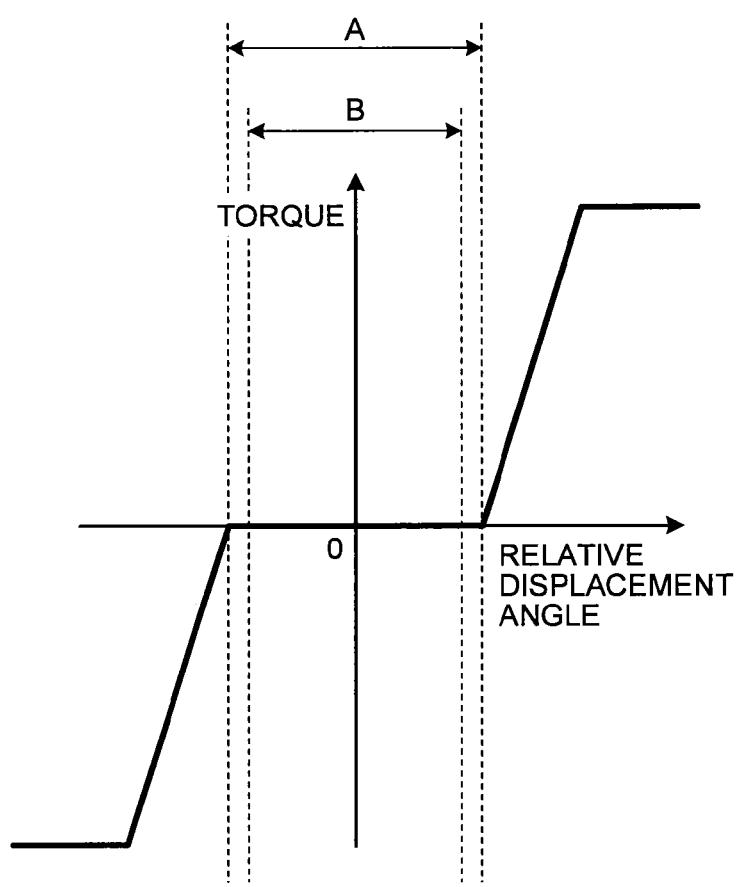
FIG. 6 is a graph explaining an operation of the power transmission device according to the first embodiment.

FIG. 1 is a partial sectional view illustrating a schematic configuration in a periphery of a clearance forming section of a power transmission device according to a first embodiment, FIG. 2 is a sectional view of the power transmission device taken along line A1-A1 of FIG. 1, FIG. 3 is a schematic view illustrating a schematic configuration of a vehicle according to the first embodiment, FIG. 4 is a graph explaining power generated by an internal combustion engine according to the first embodiment, FIG. 5 is a graph explaining power generated by a motor according to the first embodiment, and FIG. 6 is a graph explaining an operation of the power transmission device according to the first embodiment.

A power transmission device 20 of the exemplary embodiment illustrated in FIGS. 1 and 2 transmits power generated by power sources for travelling and is mounted on a vehicle 1 illustrated in FIG. 3. Here, first, a schematic configuration of the vehicle 1 will be explained referring to FIG. 3. Since the vehicle 1 propelled by driving drive wheels 30 in rotation, the vehicle 1 is a so-called "hybrid vehicle" mounted with an internal combustion engine 10 as a power source (prime mover) for travelling and motor generators (hereinafter, abbreviated as "motors" unless otherwise described) MG1, MG2 as electric motors capable of generating power. The vehicle 1 includes the internal combustion engine 10, the power transmission device 20 coupled with the internal combustion engine 10, the drive wheels 30 which are driven in rotation by power transmitted via the power transmission device 20, and an ECU 40 which is an electronic control device.

The internal combustion engine 10 is a heat engine which converts energy of fuel to a mechanical work by combusting the fuel and outputs the mechanical work. The internal combustion engine 10 can cause a crankshaft 11 to generate mechanical power (engine torque) by combusting the fuel and can output the mechanical power from the crankshaft 11 to the drive wheels 30.

The power transmission device 20 transmits power generated by the power source for travelling to the drive wheels 30 and is configured including the motors MG1, MG2, a planetary gear mechanism 50, a speed reduction mechanism 60, a differential mechanism 70, and the like.

The motors MG1, MG2 are rotating electric machines, that is, so-called motor generators which have a function as an electric motor for converting electric power supplied thereto to mechanical power and a function as a generator for converting input mechanical power to electric power. The motor MG1 is mainly used as a generator which receives an output of the internal combustion engine 10 and generates electric power, and the motor MG2 is mainly used as an electric motor which outputs power for travelling. The motor MG2 is composed of an alternating current synchronous motor and the like, can be driven by receiving AC power supplied from an inverter (not illustrated), can generate mechanical power (motor torque) to a rotor, and can output the mechanical power from the rotor to the drive wheels 30. The motor MG1 also has a configuration as an alternating current synchronous motor likewise the motor MG2. In the motor MG1, a rotor is coupled with a rotating shaft 21 which can be rotated about a rotation axis line C1, and, in the motor MG2, a rotor is coupled with a rotating shaft 22 which can be rotated about a rotation axis line C2 which is in parallel with the rotation axis line C1.

The planetary gear mechanism 50 can divide (sort) the mechanical power output from the internal combustion engine 10 to the motor MG1 side and to the drive wheels 30 sides. The planetary gear mechanism 50 is configured including a sun gear 50s, a carrier 50c, and a ring gear 50r which can rotate about the same rotation axis line C1 as plural rotating elements. The sun gear 50s is coupled with the rotating shaft 21. The carrier 50c is coupled with the crankshaft 11. The ring gear 50r is coupled with a first counter drive gear 23.

The speed reduction mechanism 60 integrates the mechanical power transmitted from the planetary gear mechanism 50 and the mechanical power transmitted from the rotating shaft 22 and increases torque by decelerating the integrated mechanical power. The speed reduction mechanism 60 is configured including a counter shaft 61, a counter driven gear 62, and a final drive gear 63. The counter shaft 61 is a rotating shaft which can rotate about a rotation axis line C3 that is in parallel with the rotation axis lines C1, C2. The counter driven gear 62 is coupled with the counter shaft 61 and is meshed with the first counter drive gear 23. The final drive gear 63 is coupled with the counter shaft 61.

Here, in the motor MG2 described above, the rotating shaft 22 is coupled with a second counter drive gear 24. The counter driven gear 62 is also meshed with the second counter drive gear 24 together with the first counter drive gear 23. The mechanical power output from the motor MG2 is transmitted to the counter driven gear 62 via the rotating shaft 22 and the second counter drive gear 24.

The differential mechanism 70 distributes the mechanical power transmitted from the speed reduction mechanism 60 to right/left drive shafts 71 and outputs the distributed mechanical power. The differential mechanism 70 is configured including a ring gear 72 and the like. The ring gear 72 is meshed with the final drive gear 63. The drive wheels 30 are coupled with the right/left drive shafts 71, respectively and rotate integrally together with the drive shafts 71.

The ECU 40 is a control device for controlling the internal combustion engine 10 and the motors MG1, MG2 in cooperation. The ECU 40 is mainly composed of a known microcomputer which includes a CPU, ROM, RAM, and an interface. The ECU 40 is input with electric signals corresponding to results of detection detected by various sensors, outputs drive signals to respective units of the vehicle 1 such as a fuel injection unit and a throttle valve unit of the internal combustion engine 10, the motors MG1, MG2, and the inverter and can control the drive of these units. The vehicle 1 is configured so as to be able to use the internal combustion engine 10 and the motors MG1, MG2 in combination or selectively as prime movers by being controlled by the ECU 40.

In the power transmission device 20 configured as described above, the first counter drive gear 23 and the ring gear 50$r$ are rotated in association with the drive wheels 30 and the drive shafts 71 in addition to the counter driven gear 62, the second counter drive gear 24, the rotating shaft 22, and the rotor of the motor MG2. The power transmission device 20 divides the mechanical power, which is output from the crankshaft 11 of the internal combustion engine 10 to the carrier 50$c$, from a pinion 50$p$ of the planetary gear mechanism 50 to the sun gear 50$s$ and the ring gear 50$r$. Then, the power transmission device 20 integrates the mechanical power from the internal combustion engine 10, which is transmitted from the ring gear 50$r$ to the first counter drive gear 23, and the mechanical power from the motor MG2, which is transmitted from the rotating shaft 22 to the second counter drive gear 24 by the counter driven gear 62 and transmits the integrated mechanical power to the drive wheels 30 via the differential mechanism 70 and the drive shafts 71.

Incidentally, the power from the internal combustion engine 10 and the power from the motor MG2 which are applied to the vehicle 1 as described above generally have tendencies as exemplified in FIGS. 4 and 5. In schematic views illustrated in FIGS. 4 and 5, a horizontal axis is a time axis, a vertical axis shows torque T, speed difference (speed variation) $\Delta N$, and displacement in rotation direction $\theta$ generated by the speed difference. In FIG. 4, "Ti" shows torque input from the internal combustion engine 10 to the counter shaft 61, "To" shows average torque of the counter shaft 61 (which is assumed constant), "I" shows an inertial mass, "Ni" shows a revolution speed of the power input from the internal combustion engine 10 to the counter shaft 61, and "No" shows an average revolution speed of the counter shaft 61 (which is assumed constant).

That is, as illustrated in FIG. 4, the power from the internal combustion engine 10 has such a tendency that the power has a relatively large variation component due to combustion (explosion) of fuel, whereas, as illustrated in FIG. 5, the power from the motor MG2 has such a tendency that the power has a relatively small variation component in a state of the same number of revolutions. Accordingly, in the power transmission device 20 described above, when a relative amplitude (which corresponds to, for example, an amplitude of the displacement $\theta$ of FIG. 4) of a tooth surface of the counter driven gear 62 on the internal combustion engine 10 side in a rotating direction to a tooth surface of the second counter drive gear 24 on the motor MG2 side becomes larger than a predetermined amplitude due to the variation component of the power of the internal combustion engine 10 in, for example, a section where the power from the motor MG2 is applied to the power from the internal combustion engine 10, that is, in a section where the counter driven gear 62 is meshed with the second counter drive gear 24, there is a possibility that the tooth surface of the counter driven gear 62 collides with the tooth surface of the second counter drive gear 24. Then, in the power transmission device 20, as the power of the internal combustion engine 10 varies, when the tooth surface of the counter driven gear 62 and the tooth surface of the second counter drive gear 24 are relatively displaced in the rotating direction in a range of backlash in a mesh section and gear-tooth hammering occurs, there is a possibility that rattling noise such as so-called gear-tooth hammering noise occurs, and thereby there is a possibility that noise becomes large and an uncomfortable feeling is applied to an occupant of the vehicle 1.

In the power transmission device 20, when the motor MG2 is driven, since a force, which presses the tooth surface of the counter driven gear 62 and the tooth surface of the second counter drive gear 24, is generated by the output torque of the motor MG2, the gear-tooth hammering noise less occurs. In contrast, when the power from the motor MG2 is 0, that is, the motor MG2 has no load (when stops), since the second counter drive gear 24 is only rotated following the rotation of the counter driven gear 62 and a force for suppressing the tooth surface of the second counter drive gear 24 become insufficient, there is a tendency that the gear-tooth hammering noise as described above is likely generated by the variation component of the power from the internal combustion engine 10.

Thus, as illustrated in FIGS. 1 and 2, in a transmission mechanism 80, which transmits the power generated by the motor MG2 as an electric motor to the counter shaft 61 as an output shaft to which the power generated by the internal combustion engine 10 is transmitted via engagement sections 82 of plural rotating members 81, the power transmission device 20 suppresses gear-tooth hammering noise, and thereby suppresses noise by forming a predetermined amount of a play $\theta t$ to the engagement sections 82.

The transmission mechanism 80 is configured including the rotating shaft 22, the second counter drive gear 24, and the counter driven gear 62 described above. The rotating shaft 22 is coupled with the rotor of the motor MG2 and is supported by a bearing 25 so as to be able to rotate about the rotation axis line C2 with respect to a housing (not illustrated).

Here, the rotating shaft 22 is divided to the intermediate rotating shaft 26 and the motor side rotating shaft 27 in a direction along the rotation axis line C2 (hereinafter, unless otherwise described, called "axis direction of the rotation axis line C2"). The intermediate rotating shaft 26 is coupled with the second counter drive gear 24 integrally therewith, and the motor side rotating shaft 27 is disposed to the motor MG2 side of the intermediate rotating shaft 26 and connected to the intermediate rotating shaft 26 via a fitting section 82b.

That is, the transmission mechanism 80 of the exemplary embodiment is configured including, as the plural rotating members 81, the counter driven gear 62 as a first gear, which is disposed to the counter shaft 61 and to which the power generated by the internal combustion engine 10 is transmitted, the intermediate rotating shaft 26 as an intermediate rotating member, which is meshed with the counter driven gear 62 and to which the second counter drive gear 24 as a second gear that can transmit the power generated by the motor MG2 to the counter driven gear 62 is disposed, and the motor side rotating shaft 27 as an electric motor side rotating member disposed between the intermediate rotating shaft 26 and the motor MG2.

Then, the transmission mechanism 80 has the play $\theta t$ to the engagement sections 82 of the plural rotating members 81 along a rotating direction of the rotating members 81, the play $\theta t$ being larger than a maximum relative displacement amount $\Delta\theta max$ between the rotating member 81 on the internal combustion engine 10 side and the rotating member 81 on the motor MG2 side (for example, corresponding to a relative displacement amount $\Delta\theta$ of FIG. 4) when a rotation variation phase difference between the internal combustion engine 10 and the motor MG2 is maximum.

Here, the rotating member 81 on the internal combustion engine 10 side is the counter driven gear 62, and the rotating member 81 on the motor MG2 side is the motor side rotating shaft 27. The maximum relative displacement amount $\Delta\theta max$ when the rotation variation phase difference between the internal combustion engine 10 and the motor MG2 is maximum corresponds to a maximum relative amplitude to a rotating direction of the counter driven gear 62 with respect to the motor side rotating shaft 27 caused by the variation component of the power of the internal combustion engine 10.

The engagement sections 82 of the plural rotating members 81 are sections where the plural rotating members 81 are engaged in the rotating direction and here include a mesh section 82a of a tooth 62a of the counter driven gear 62 and a tooth 24a of the second counter drive gear 24 and the fitting section 82b of the intermediate rotating shaft 26 and the motor side rotating shaft 27. In the transmission mechanism 80, a total play $\theta t$ along the rotating direction (corresponding to a circumferential direction about the axis of the rotation axis line C2) in the mesh section 82a and the fitting section 82b as the engagement section 82 is set larger than the maximum relative displacement amount $\Delta\theta max$.

The play $\theta t$ in the rotating direction of the transmission mechanism 80 of the exemplary embodiment is a so-called rattle in the transmission mechanism 80 and is a gap existing in respective sections in a transmission system of the transmission mechanism 80 in a motion transmission direction, that is, in the rotating direction. Here, the play $\theta t$ includes at least a backlash $\theta a$ formed in the mesh section 82a and a rotating direction clearance $\theta b$ formed in the fitting section 82b along the rotating direction. With the configuration, the power transmission device 20 can secure a predetermined amount of the play $\theta t$ while securing an optimum backlash $\theta a$ in the mesh section 82a by securing a predetermined amount of the rotating direction clearance $\theta b$ of the fitting section 82b.

The backlash $\theta a$ of the mesh section 82a is a clearance in the rotating direction intentionally formed between a tooth surfaces of the tooth 62a and the tooth 24a in the mesh section 82a. The rotating direction clearance $\theta b$ is a clearance in the rotating direction intentionally formed between the intermediate rotating shaft 26 and the motor side rotating shaft 27 in the fitting section 82b and is formed by a clearance forming section 83 disposed to the fitting section 82b. The clearance forming section 83 is configured including a key member 84 disposed between the intermediate rotating shaft 26 and the motor side rotating shaft 27 in the rotating direction and accommodating sections 85, 86 for accommodating the key member 84.

Here, the fitting section 82b, to which the clearance forming section 83 is disposed, is configured including a fitting concave section 82ba and a fitting convex section 82bb. Here, in the fitting section 82b, although the fitting concave section 82ba is disposed to the intermediate rotating shaft 26 side, and the fitting convex section 82bb is disposed to the motor side rotating shaft 27 side, the fitting concave section 82ba and the fitting convex section 82bb may be disposed oppositely. The fitting concave section 82ba is disposed to an end of the cylindrical intermediate rotating shaft 26 on the motor side rotating shaft 27 side using the rotation axis line C2 as a center axis line. The fitting concave section 82ba is formed as a columnar hollow section using the rotation axis line C2 as a center axis line. The fitting convex section 82bb is disposed to an end of the cylindrical motor side rotating shaft 27 on the intermediate rotating shaft 26 side using the rotation axis line C2 as a center axis line. The fitting convex section 82bb is formed as a cylindrical projecting section using the rotation axis line C2 as a center axis line. The intermediate rotating shaft 26 is connected to the motor side rotating shaft 27 by that the fitting convex section 82bb is fitted to the fitting concave section 82ba in the fitting section 82b.

Then, the accommodating section 85 and the accommodating section 86 of the clearance forming section 83 are formed to an inner peripheral surface 26a of the fitting concave section 82ba and to an outer peripheral surface 27a of the fitting convex section 82bb in confrontation in a direction orthogonal to the axis direction of the rotation axis line C2 (hereinafter, unless otherwise described, called "a radial direction of the rotation axis line C2"), respectively. The key member 84 is interposed between the intermediate rotating shaft 26 and the motor side rotating shaft 27 and held in the accommodating sections 85, 86 with a predetermined clearance formed in the circumferential direction, and the clearance acts as the rotating direction clearance $\theta b$ described above. In an example of FIG. 2, the rotating direction clearance $\theta b$ is a total of a clearance $\theta b1$ of the key member 84 on one side in the rotating direction and a clearance $\theta b2$ of the key member 84 on the other side. Note that the clearance may be offset to any one side of the key member 84.

In the example of FIG. 2, the clearance forming sections 83 are formed at equal intervals at plural positions (here, four positions) along the circumferential direction. With the configuration, the power transmission device 20 can prevent the rotating shaft 22, which is composed of the intermediate rotating shaft 26 and the motor side rotating shaft 27, from being decentered to the rotation axis line C2.

FIG. 6 is a schematic view for explaining an operation of the power transmission device 20, wherein a horizontal axis shows a relative displacement angle between the counter driven gear 62 and the motor side rotating shaft 27 in the rotating direction, and a vertical axis shows torque generated to the motor side rotating shaft 27 in response to the relative displacement angle. As illustrated in the view, in the power transmission device 20, a relative displacement angle region A in response to the play $\theta t$ is set as a region including a relative displacement angle region B whose relative displacement angle is equal to or less than a maximum relative displacement angle when the rotation variation phase difference between the internal combustion engine 10 and the motor MG2 in response to the maximum relative displacement amount Δθmax described above is maximum.

When the relative displacement angle between the counter driven gear 62 and the motor side rotating shaft 27 in the rotating direction is located in the relative displacement angle region A in response to the play θt, since the relative displacement between the counter driven gear 62 and the motor side rotating shaft 27 in the rotating direction is absorbed by the play θt in the engagement sections 82, no torque is transmitted between the counter driven gear 62 and the motor side rotating shaft 27. In other words, the relative displacement angle region A in response to the play θt acts as a dead zone of torque generated to the motor side rotating shaft 27 with respect to the relative displacement angle between the counter driven gear 62 and the motor side rotating shaft 27.

Then, when the relative displacement angle between the counter driven gear 62 and the motor side rotating shaft 27 in the rotating direction is located outside of the relative displacement angle region A, the relative displacement between the counter driven gear 62 and the motor side rotating shaft 27 in the rotating direction becomes large than the play θt in the engagement sections 82, and torque is transmitted from the counter driven gear 62 to the motor side rotating shaft 27 or from the motor side rotating shaft 27 to the counter driven gear 62.

In the power transmission device 20 configured as described above, when the motor MG2 outputs power or when the motor MG2 is input with power at the time of regeneration and the like, since an end face of the key member 84 in the rotating direction is abutted to a wall surface of the accommodating section 85 of the intermediate rotating shaft 26 and the other end face of the key member 84 is abutted to a wall surface of the accommodating section 86 of the motor side rotating shaft 27, a relative rotation between the intermediate rotating shaft 26 and the motor side rotating shaft 27 is regulated, and power is mutually transmitted between the intermediate rotating shaft 26 and the motor side rotating shaft 27 via the key member 84.

Then, in the power transmission device 20, since the transmission mechanism 80 has the play θt, which is larger than the maximum relative displacement amount Δθmax when the rotation variation phase difference between the internal combustion engine 10 and the motor MG2 is maximum, to the engagement sections 82 along the rotating direction, even when the counter driven gear 62 and the motor side rotating shaft 27 are relatively displaced in the rotating direction due to a variation component of power of the internal combustion engine 10 at the time, for example, no load is applied to the motor MG2, and the like, the relative displacement component (a relative amplitude component of the counter driven gear 62 to the motor side rotating shaft 27 in the rotating direction) can be absorbed by the play θt. Accordingly, the power transmission device 20 can suppress an occurrence of collision and rattle hammering between the tooth surface of the counter driven gear 62 and the tooth surface of the second counter drive gear 24 and further even if the collision and the rattle hammering occur, the power transmission device 20 can suppress a shock. As a result, the power transmission device 20 can suppress noise from being generated by the variation component of the power from the internal combustion engine 10 by the engagement sections 82 including a section at which the power from the motor MG2 is added to the power from the internal combustion engine 10.

Note that an inertial mass of the intermediate rotating shaft 26 of the exemplary embodiment is formed smaller than an inertia mass of the motor side rotating shaft 27. With the configuration, since the power transmission device 20 can relatively reduce the inertial mass of the intermediate rotating shaft 26 which may be collided with the counter driven gear 62 in the rotating direction in response to a variation of the power of the internal combustion engine 10, the variation component of the power of the internal combustion engine 10 can be prevented from being directly received by a member having a large inertial mass. As a result, even when the tooth surface of the counter driven gear 62 is collided with the tooth surface of the second counter drive gear 24, since the tooth surface of the second counter drive gear 24 escapes and the tooth surface of the counter driven gear 62 is in a state that as if the tooth surface swings away, the power transmission device 20 can reduce an impact force and can reliably suppress an occurrence of large noise.

According to the power transmission device 20 according to the exemplary embodiment of the present invention explained above, the counter shaft 61, to which the power generated by the internal combustion engine 10 is transmitted, is provided with the transmission mechanism 80 which transmits the power generated by the motor MG2 via the engagement sections 82 of the plural rotating members 81, and the transmission mechanism 80 has the play θt, which is larger than the maximum relative displacement amount Δθmax between the rotating member 81 on the internal combustion engine 10 side and the rotating member 81 on the motor MG2 side when the rotation variation phase difference between the internal combustion engine 10 and the motor MG2 is maximum, to the engagement sections 82 along the rotating direction of the rotating members 81.

Accordingly, since the power transmission device 20 has the play θt larger than the maximum relative displacement amount Δθmax along the rotating direction to the engagement sections 82 of the transmission mechanism 80, the power transmission device 20 can suppress an occurrence of noise by the variation component of the power from the internal combustion engine 10 by the engagement sections 82. As a result, the power transmission device 20 can suppress an application of the uncomfortable feeling to the occupant of the vehicle 1 and can secure a comfortable travel feeling as well as can avoid, in the vehicle 1, to operate the internal combustion engine 10 in an operation region of the internal combustion engine 10 having a bad efficiency to prevent noise and can operate the internal combustion engine 10 in an operation region having a relatively good efficiency, and thereby fuel economy can be improved. Further, since the power transmission device 20 does not need electric power and the like to suppress the gear-tooth hammering noise, the fuel economy can be improved also in this point.

Note that, in the power transmission device 20 explained above, the rotating shaft 22 may be divided to three or more sections in the axis direction of the rotation axis line C2. Further, in the explanation, although the play θt of the transmission mechanism 80 in the rotating direction is explained assuming that the play θt includes the backlash θa formed to the mesh section 82a and the rotating direction clearance θb formed to the fitting section 82b along the rotating direction, the play θt may be formed of only any one of them. For example, the power transmission device 20 can also form a predetermined amount of the play θt only of the backlash θa of the mesh section 82a, and, in the case, the rotating shaft 22 need not be divided and the clearance forming section 83 and the like need not be separately provided as a configuration for suppressing noise. In the case, since the power transmission device 20 can suppress a number of parts for configuring the power transmission device 20, noise can be suppressed by a simpler configuration and thus a manufacturing cost can be suppressed.

Further, when the vehicle 1 is driven without depending on power of the motor MG2, the power transmission device 20 of the exemplary embodiment may be configured so as to be provided with the ECU 40 (refer to FIG. 3) as a control device which generates minute control torque for controlling the motor MG2 and rotating the motor MG2 in synchronization with the counter shaft 61. When, for example, the vehicle 1 is in such an operation state that the vehicle 1 is driven by the power of the internal combustion engine 10 without depending on the power of the motor MG2, the ECU 40 generates the minute control torque in response to a number of revolutions of the counter shaft 61. The ECU 40 can detect the number of revolutions of the counter shaft 61 in response to, for example, a vehicle speed of the vehicle 1. The minute control torque output from the motor MG2 is torque which corresponds to drag torque component in a state that the second counter drive gear 24 is rotated following the rotation of the counter driven gear 62 when, for example, no load is applied to the motor MG2. In the case the power transmission device 20 makes a number of revolutions of the second counter drive gear 24 the same as a number of revolutions of the counter driven gear 62 by that the motor MG2 generates the minute control torque in response to the number of revolutions of the counter shaft 61 under the control of the ECU 40, and thereby the power transmission device 20 can rotate the second counter drive gear 24 and the counter driven gear 62 in synchronization with each other. With the operation, the power transmission device 20 can appropriately adjust, for example, a positional relation between the tooth 62a and the tooth 24a and can more effectively suppress the occurrence of noise such as the gear-tooth hammering noise and the like.

Second Embodiment

Figure 7:
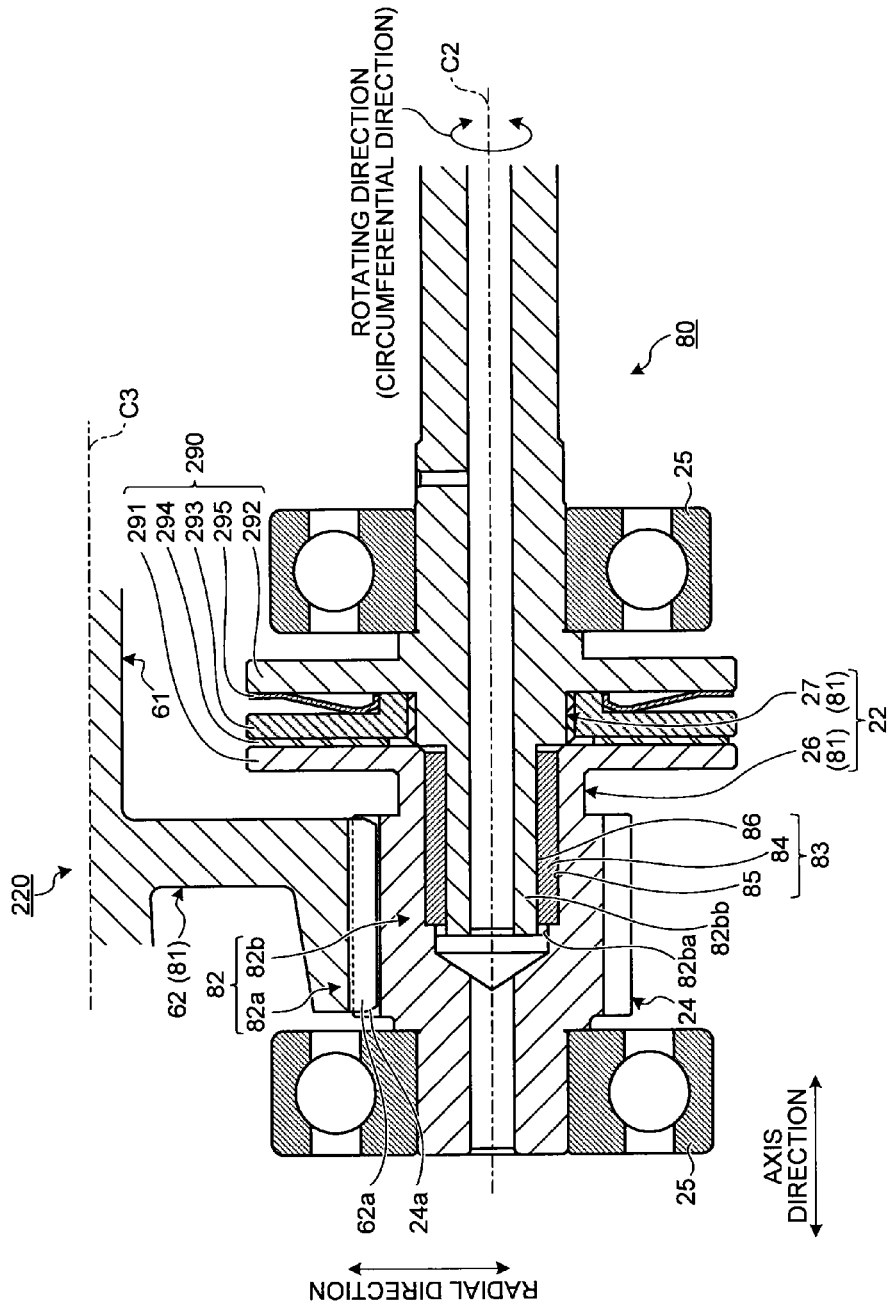
FIG. 7 is a partial sectional view illustrating a schematic configuration in a periphery of a clearance forming section of a power transmission device according to a second embodiment.
Figure 8:
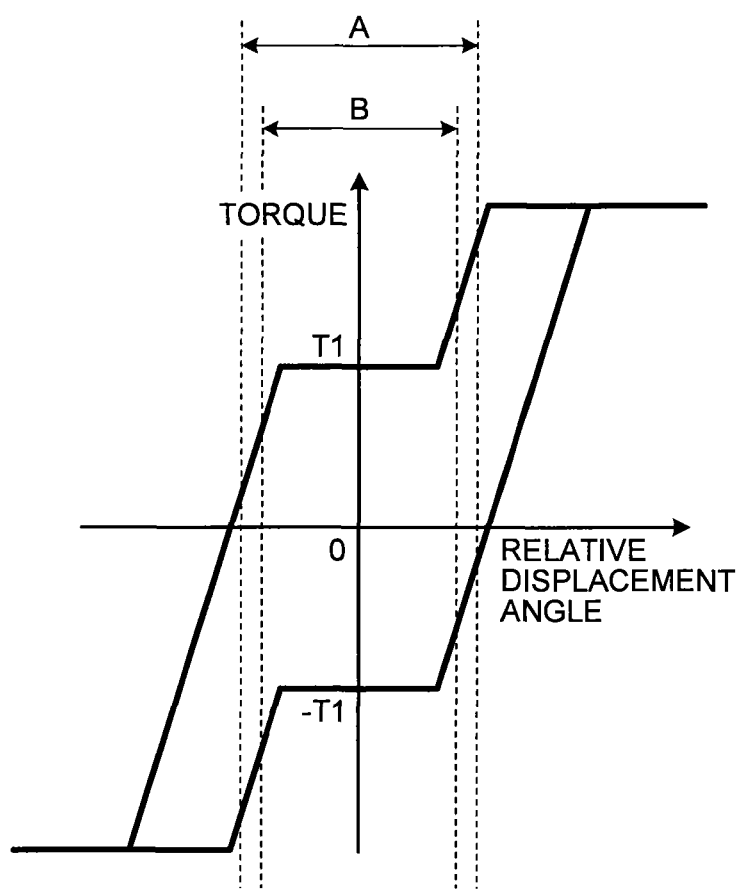
FIG. 8 is a graph explaining an operation of the power transmission device according to the second embodiment.

FIG. 7 is a partial sectional view illustrating a schematic configuration in a periphery of a clearance forming section of a power transmission device according to a second embodiment, and FIG. 8 is a graph explaining an operation of the power transmission device according to the second embodiment. The power transmission device according to the second embodiment is different from the power transmission device according to the first embodiment in that the power transmission device according to the second embodiment includes a resistance applying mechanism. In addition to the above-mentioned, a duplicate explanation of a configuration, an operation, and an effect which are common to those of the exemplary embodiment described above will not be repeated as much as possible as well as the same components are denoted by the same reference numerals (this is the same in the exemplary embodiments described below).

A power transmission device 220 of the exemplary embodiment illustrated in FIG. 7 includes a resistance applying mechanism 290. The resistance applying mechanism 290 applies a resistance to the intermediate rotating shaft 26 along a rotating direction and, here, is configured including an intermediate side flange section 291, a motor side flange section 292, a moving member 293, a friction member 294, and a spring member 295. The intermediate side flange section 291, the motor side flange section 292, the moving member 293, the friction member 294, and the spring member 295 are formed in annular plate shape which is coaxial with a rotation axis line C2. In the resistance applying mechanism 290, the intermediate side flange section 291, the friction member 294, the moving member 293, the spring member 295, and the motor side flange section 292 are disposed in this order from the intermediate rotating shaft 26 side to the motor side rotating shaft 27 side along an axis direction of the rotation axis line C2.

The intermediate side flange section 291 is disposed to an end of the intermediate rotating shaft 26 on the motor side rotating shaft 27 side integrally with the intermediate rotating shaft 26, and the motor side flange section 292 is disposed integrally with the motor side rotating shaft 27 in a section nearer to a motor MG2 side than the fitting convex section 82bb of the motor side rotating shaft 27 (right side in FIG. 7). The intermediate side flange section 291 and the motor side flange section 292 are disposed in confrontation with each other in the axis direction of the rotation axis line C2.

The moving member 293 is supported by the motor side rotating shaft 27 via, for example, a spline fitting section. Thus, the moving member 293 is configured so as to be able to move along the axis direction of the rotation axis line C2 with respect to the motor side rotating shaft 27 as well as the moving member 293 and the motor side rotating shaft 27 are configured so as to be able to transmit power mutually. The friction member 294 is disposed to a face of the moving member 293 on the intermediate side flange section 291 side. The spring member 295 is composed of, for example, a disk spring and the like and exerts a predetermined magnitude of an urging force, which is directed to the intermediate side flange section 291 side, on the moving member 293. The spring member 295 is supported by the motor side flange section 292 on a side opposite to the moving member 293. The urging force, which is exerted from the spring member 295 to the moving member 293, is set to such a magnitude that a predetermined magnitude of a press force is exerted between the friction member 294 and the intermediate side flange section 291. The urging force by the spring member 295 is preferably set such that, for example, resistance torque to be described later, which is exerted on the intermediate rotating shaft 26 becomes torque smaller than torque corresponding to a variation component of power by an internal combustion engine 10.

In the resistance applying mechanism 290 in the power transmission device 220 configured as described above, the friction member 294 comes into contact with the intermediate side flange section 291 and a press force is exerted therebetween by that the urging force is exerted from the spring member 295 to the moving member 293. With the operation, in the power transmission device 220, the intermediate rotating shaft 26 and the motor side rotating shaft 27 are engaged with each other via the intermediate side flange section 291, the friction member 294, the moving member 293, and the like and can be rotated integrally. At the time, in the power transmission device 220, resistance torque in response to a press force exerted between the friction member 294 and the intermediate side flange section 291, more specifically, resistance torque in response to an urging force is exerted to the intermediate rotating shaft 26, and the resistance torque becomes a resistance (friction) which is in response to a relative displacement angle between the counter driven gear 62 and the motor side rotating shaft 27 and along a rotating direction of the intermediate rotating shaft 26.

As illustrated in, for example, FIG. 8, the resistance torque exerted to the intermediate rotating shaft 26 is shown by "T1". Then, in the power transmission device 220, when the variation component of the power of the internal combustion engine 10 is exerted at the time, for example, no load is applied to the motor MG2 and the motor MG2 outputs power, or power is input to the motor MG2 at the time of regeneration and the like, power is transmitted mutually between the intermediate rotating shaft 26 and the motor side rotating shaft 27 via the intermediate side flange section 291, the friction member 294, the moving member 293, and the like at a stage that torque T0 transmitted between the counter driven gear 62 and the motor side rotating shaft 27 is smaller than the resistance torque T1 and a relative displacement angle between the counter driven gear 62 and the motor side rotating shaft 27 is relatively small in the rotating direction.

Then, in the power transmission device 220, when power output by the motor MG2 and power input to the motor MG2 at the time of regeneration and the like gradually become large and the torque T0 transmitted between the counter driven gear 62 and the motor side rotating shaft 27 becomes larger than the resistance torque T1, the relative displacement angle between the counter driven gear 62 and the motor side rotating shaft 27 in the rotating direction becomes relatively large and a rotating direction clearance θb of the fitting section 82b is reduced. That is, in the case, in the power transmission device 220, a relative rotation between the intermediate rotating shaft 26 and the motor side rotating shaft 27 is regulated by that an end face of the key member 84 is abutted to a wall surface of the accommodating section 85 of the intermediate rotating shaft 26 in the rotating direction and the other end face of the key member 84 is abutted to a wall surface of the accommodating section 86 of the motor side rotating shaft 27. Then, in the power transmission device 220, torque having a magnitude corresponding to T0-T1 is mutually transmitted between the intermediate rotating shaft 26 and the motor side rotating shaft 27 via the key member 84 of the clearance forming section 83.

As a result, in the power transmission device 220, since the resistance applying mechanism 290 applies a resistance to the intermediate rotating shaft 26 along the rotating direction, when, for example, a drive state of the motor MG2 shifts from a non-driven state (no load state) to a driven state, a shock (impact force) when an end face of the key member 84 in the rotating direction is abutted to a wall surface of the accommodating section 85 of the intermediate rotating shaft 26 and the other end face of the key member 84 is abutted to a wall surface of the accommodating section 86 of the motor side rotating shaft 27, that is, a shock when a rattle of the rotating direction clearance θb is reduced can be suppressed at the time. Accordingly, the power transmission device 220 can suppress rattle hammering noise from occurring in the rotating direction clearance θb of the fitting section 82b at an initial operation. Further, the power transmission device 220 can suppress that the intermediate rotating shaft 26 having a relatively small inertial mass jumps and generates noise by applying the resistance to the intermediate rotating shaft 26 along the rotating direction by the resistance applying mechanism 290. Further, for example, since the power transmission device 220 can make an amplitude of the intermediate rotating shaft 26 in the rotating direction caused by a torque variation of the internal combustion engine 10 relatively small by that the resistance applying mechanism 290 applies the resistance to the intermediate rotating shaft 26 along the rotating direction, the rotating direction clearance θb formed by the clearance forming section 83 can be also made small by the reduced amount of the amplitude, and thus the power transmission device 220 can be configured more compact.

According to the power transmission device 220 according to the exemplary embodiment of the present invention explained above, the intermediate rotating shaft 26 is provided with the resistance applying mechanism 290 for applying the resistance along the rotating direction. Accordingly, the power transmission device 220 can suppress a shock and noise when a rattle in a play θt disposed to the transmission mechanism 80 is reduced by applying the resistance to the intermediate rotating shaft 26 along the rotating direction by the resistance applying mechanism 290 and can smoothly connect, for example, a transient state from the non-driven state to the driven state of the motor MG2, and thereby can secure a comfortable travel feeling.

Third Embodiment

Figure 9:
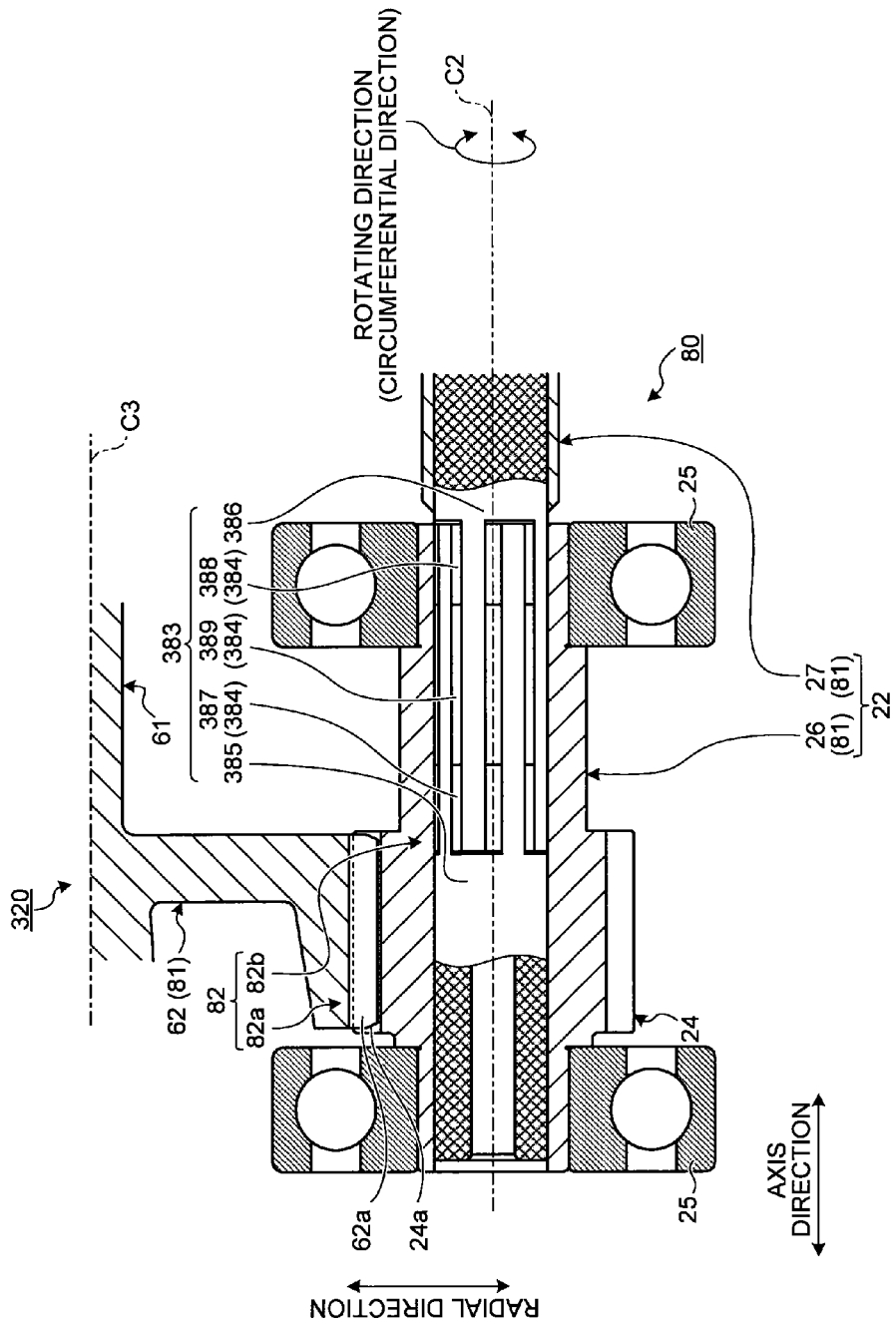
FIG. 9 is a partial sectional view illustrating a schematic configuration in a periphery of a clearance forming section of a power transmission device according to a third embodiment.
Figure 10:
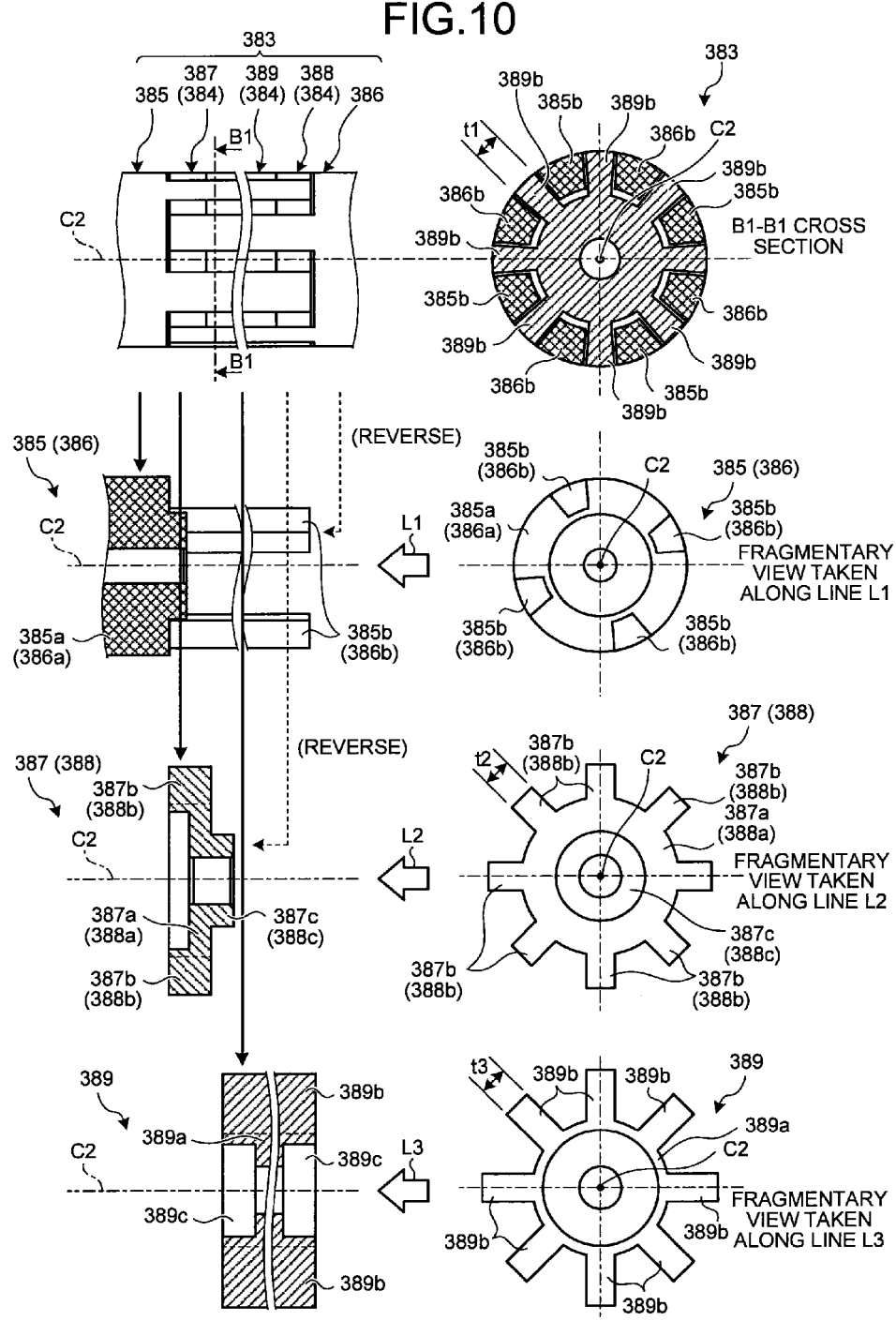
FIG. 10 is a schematic outline view explaining a schematic configuration of the clearance forming section according to the third embodiment.
Figure 11:
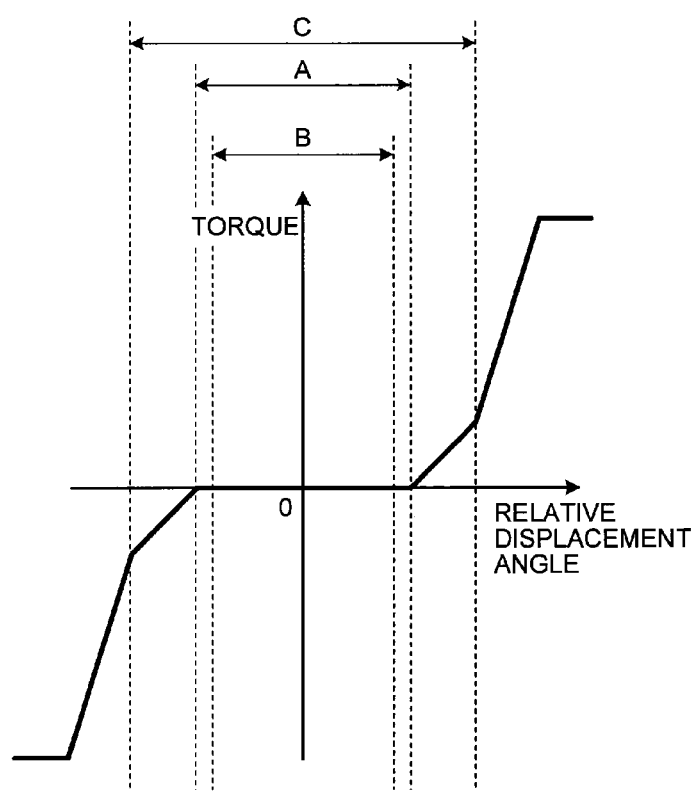
FIG. 11 is a graph explaining an operation of the power transmission device according to the third embodiment.

FIG. 9 is a partial sectional view illustrating a schematic configuration in a periphery of a clearance forming section of a power transmission device according to a third embodiment, FIG. 10 is a schematic outline view explaining a schematic configuration of the clearance forming section according to the third embodiment, and FIG. 11 is a graph explaining an operation of a power transmission device according to the third embodiment. The power transmission device according to the third embodiment is different from the power transmission device according to the first embodiment in a configuration of a clearance forming section and that the clearance forming section has plural vibration absorbing members.

A power transmission device 320 of the exemplary embodiment illustrated in FIG. 9 has a clearance forming section 383 disposed to the fitting section 82b. The clearance forming section 383 of the exemplary embodiment has vibration absorbing members 384 disposed between the intermediate rotating shaft 26 and the motor side rotating shaft 27 in a rotating direction. With the configuration, since the vibration absorbing members 384 are interposed between the intermediate rotating shaft 26 and the motor side rotating shaft 27 in the rotating direction, the power transmission device 320 suppresses a shock and noise when a rattle in a play θt disposed to the transmission mechanism 80 is reduced. To explain in more details, the clearance forming section 383 of the exemplary embodiment includes the plural vibration absorbing members 384 having a different elastic modulus. Here, the clearance forming section 383 is configured such that, as a relative angle between the intermediate rotating shaft 26 and the motor side rotating shaft 27 increases, the vibration absorbing member 384 having a low elastic modulus is exerted to the intermediate rotating shaft 26 and the motor side rotating shaft 27 prior to the vibration absorbing member 384 having a high elastic modulus.

Specifically, as illustrated in FIGS. 9 and 10, the clearance forming section 383 is configured including the plural vibration absorbing members 384 having the different elastic modulus, an intermediate side shell member 385, and a motor side shell member 386. The clearance forming section 383 is configured including first vibration absorbing members 387, 388 and a second vibration absorbing member 389 as the plural vibration absorbing members 384 having the different elastic modulus, and the first vibration absorbing members 387, 388 and the second vibration absorbing member 389 are held by the intermediate side shell member 385 and the motor side shell member 386.

The intermediate side shell member 385 and the motor side shell member 386 have an approximately similar configuration and are configured including cylindrical cylinder sections 385a, 386a and projecting sections 385b, 386b formed by projecting from the cylinder sections 385a, 386a along an axis direction of a rotation axis line C2, respectively. Plural projecting sections 385b and plural projecting sections 386b (here, each four pieces) are disposed to outer edges of the cylinder sections 385a, 386a at equal intervals along a circumferential direction, respectively.

The intermediate side shell member 385 is disposed on an inner peripheral side of the intermediate rotating shaft 26 so that a center axis line of the cylinder section 385a becomes coaxial with the rotation axis line C2. The intermediate side shell member 385 is disposed rotatably integrally with the intermediate rotating shaft 26. The motor side shell member 386 is disposed on an inner peripheral side of the motor side rotating shaft 27 so that a center axis line of cylinder section 386a becomes coaxial with the rotation axis line C2. The motor side shell member 386 is disposed so as to be able to rotate integrally with the motor side rotating shaft 27. Then, in a state that the intermediate side shell member 385 and the motor side shell member 386 are assembled to the intermediate rotating shaft 26 and the motor side rotating shaft 27, the intermediate side shell member 385 and the motor side shell member 386 are disposed in such a positional relation that the projecting sections 385b and the projecting sections 386b are alternately positioned along the circumferential direction and a clearance t1 along the rotating direction (circumferential direction) is formed between the projecting sections 385b and the projecting sections 386b which are adjacent in the circumferential direction.

The first vibration absorbing members 387, 388 and the second vibration absorbing member 389 have an approximately similar configuration and are configured including cylindrical cylinder sections 387a, 388a, 389a and projecting sections 387b, 388b, 389b formed by projecting from the cylinder sections 387a, 388a, 389a along a radial direction of the rotation axis line C2, respectively. Plural projecting sections 387b, plural projecting sections 388b, and plural projecting sections 389b (here, each eight pieces) are disposed to outer edges of the cylinder sections 387a, 388a, 389a along the circumferential direction at equal intervals, respectively. However, the first vibration absorbing members 387, 388 have cylinder convex sections 387c, 388c formed to end faces of the cylinder sections 387a, 388a along an axis direction of the rotation axis line C2, respectively, whereas the second vibration absorbing member 389 has cylinder concave sections 389c formed to both end faces of the cylinder section 389a along the axis direction of the rotation axis line C2.

Then, the first vibration absorbing members 387, 388 and the second vibration absorbing member 389 are held by the intermediate side shell member 385 and the motor side shell member 386 so that center axis lines of the cylinder sections 387a, 388a, 389a become coaxial with the rotation axis line C2 in a state that the first vibration absorbing members 387, 388 are positioned on both sides of the second vibration absorbing member 389 in the axis direction, respectively and the respective cylinder convex sections 387c, 388c are engaged with the cylinder concave sections 389c, respectively. The first vibration absorbing members 387, 388 and the second vibration absorbing member 389 are disposed in such a positional relation that the cylinder sections 387a, 388a, 389a are held on inner peripheral sides of the projecting sections 385b, 386b, and each one of the respective projecting sections 387b, 388b, 389b is disposed between the projecting sections 385b and the projecting sections 386b which are adjacent in the peripheral direction, respectively. In the first vibration absorbing members 387, 388 and the second vibration absorbing member 389, the projecting sections 387b, 388b, 389b function likewise the key member 84 described above (refer to FIG. 2).

Then, the second vibration absorbing member 389 is composed of a member having an elastic modulus lower than an elastic modulus of the first vibration absorbing members 387, 388 (conversely, the first vibration absorbing members 387, 388 are composed of a member having an elastic modulus higher than the elastic modulus of the second vibration absorbing member 389). Here, the first vibration absorbing members 387, 388 are, for example, aluminum members, and the second vibration absorbing member 389 is a rubber member. Then, the second vibration absorbing member 389 has a length t3 along the rotating direction (circumferential direction) of the projecting section 389b set longer than a length t2 along the rotating direction (circumferential direction) of the projecting sections 387b, 388b (conversely, the length t2 is set shorter than the length t3). That is, a relation among the clearance t1 and the length t2 and the length t3 is set to satisfy the following expression (1).

$$t2 < t3 < t1 \qquad (1)$$

As a result, in the clearance forming section 383, a predetermined clearance is formed between the projecting section 389b and the projecting sections 385b, 386b in the circumferential direction in a state that the first vibration absorbing members 387, 388 and the second vibration absorbing member 389 are held by the intermediate side shell member 385 and the motor side shell member 386, and the clearance acts the rotating direction clearance θb described above. That is, the rotating direction clearance θb in the clearance forming section 383 corresponds to t1−t3. Then, in the clearance forming section 383, a clearance in the circumferential direction which is larger than the rotating direction clearance θb (that is, (t1−t2) is formed between the projecting sections 387b, 388b and the projecting sections 385b, 386b in a state that the first vibration absorbing members 387, 388 and the second vibration absorbing member 389 are held by the intermediate side shell member 385 and the motor side shell member 386.

That is, the clearance forming section 383 is configured such that the clearance (t1−t3) in the circumferential direction between the projecting section 389b and the projecting sections 385b, 386b of the second vibration absorbing member 389 having the low elastic modulus smaller than the clearance (t1−t2) in the circumferential direction between the projecting sections 387b, 388b and the projecting sections 385b, 386b of the first vibration absorbing members 387, 388 having the high elastic modulus. With the configuration, the clearance forming section 383 can be configured so that, as a relative angle between the intermediate rotating shaft 26 and the motor side rotating shaft 27 increases, the second vibration absorbing member 389 having the low elastic modulus is exerted to the intermediate rotating shaft 26 and to the motor side rotating shaft 27 prior to the first vibration absorbing members 387, 388 having the high elastic modulus.

The power transmission device 320 configured as described above can obtain characteristics as illustrated in FIG. 11. That is, when the relative displacement angle between the counter driven gear 62 and the motor side rotating shaft 27 in the rotating direction is in a relative displacement angle region A in response to the play (a total play of the clearance (t1−t3)=the rotating direction clearance θb in the second vibration absorbing member 389 and the backlash θa) θt, the relative displacement between the counter driven gear 62 and the motor side rotating shaft 27 in the rotating direction is absorbed by the play θt in the engagement sections 82.

Then, when, for example, a drive state of a motor MG2 shifts from a non-driven state (no load state) to a driven state and the relative displacement angle between the counter driven gear 62 and the motor side rotating shaft 27 in the rotating direction is in a region outside of the relative displacement angle region A as well as in a region inside of a relative displacement angle region C in response to a total play of the clearance (t1−t2) by the first vibration absorbing members 387, 388 and the backlash θa, first, the projecting section 389b of the second vibration absorbing member 389 is abutted to the projecting sections 385b, 386b. As a result, in the power transmission device 320, power is mutually transmitted between the intermediate rotating shaft 26 and the motor side rotating shaft 27 via the projecting section 389b of the second vibration absorbing member 389. At the time, in the power transmission device 320, the second vibration absorbing member 389 having the low elastic modulus can absorb a shock (absorbs vibration) when a play of the rotating direction clearance θb is reduced and can suppress the shock by that, first, the projecting section 389b of the second vibration absorbing member 389 is abutted to the projecting sections 385b, 386b. Accordingly, the power transmission device 320 can suppress hammering noise from occurring in the rotating direction clearance θb of the fitting section 82b at the time of initial operation.

Then, when the relative displacement angle between the counter driven gear 62 and the motor side rotating shaft 27 in the rotating direction is outside of the relative displacement angle region C, the projecting sections 387b, 388b of the first vibration absorbing members 387, 388 are abutted to the projecting sections 385b, 386b. As a result, in the power transmission device 320, finally, power is mutually transmitted between the intermediate rotating shaft 26 and the motor side rotating shaft 27 via the projecting sections 387b, 388b of the first vibration absorbing members 387, 388 having the high elastic modulus, and thereby a deterioration of power transmission efficiency can be suppressed.

As described above, since the clearance forming section 383 has the first vibration absorbing members 387, 388 and the second vibration absorbing member 389 as the plural vibration absorbing members 384 having the different elastic modulus, the power transmission device 320 can change a degree of suppression of a shock and noise, when the play in the play θt disposed to the transmission mechanism 80 is reduced, at plural stages, as the relative angle between the intermediate rotating shaft 26 and the motor side rotating shaft 27 increases, and thus the power transmission device 320 can be more minutely and appropriately set shock absorption characteristics. As a result, as described above the power transmission device 320 can appropriately achieve, for example, a suppression of shock when the play of the rotating direction clearance θb is reduced and a suppression of deterioration of the power transmission efficiency at the same time.

According to the power transmission device 320 according to the exemplary embodiment of the present invention explained above, the clearance forming section 383 has the vibration absorbing members 384 disposed between the intermediate rotating shaft 26 and the motor side rotating shaft 27 in the rotating direction. Accordingly, the power transmission device 320 can suppress a shock and noise when the backlash in the play θt disposed to the transmission mechanism 80 is reduced by the vibration absorbing members 384 and can smoothly connect, for example, the transient state from the non-driven state to the driven state of the motor MG2, and thereby can secure a comfortable travel feeling.

Note that although the power transmission device 320 explained above is explained assuming that the clearance forming section 383 has the plural vibration absorbing members 384 having the different elastic modulus, the power transmission device 320 is not limited thereto and all the plural vibration absorbing members 384 may have the same elastic modulus.

Fourth Embodiment

Figure 12:
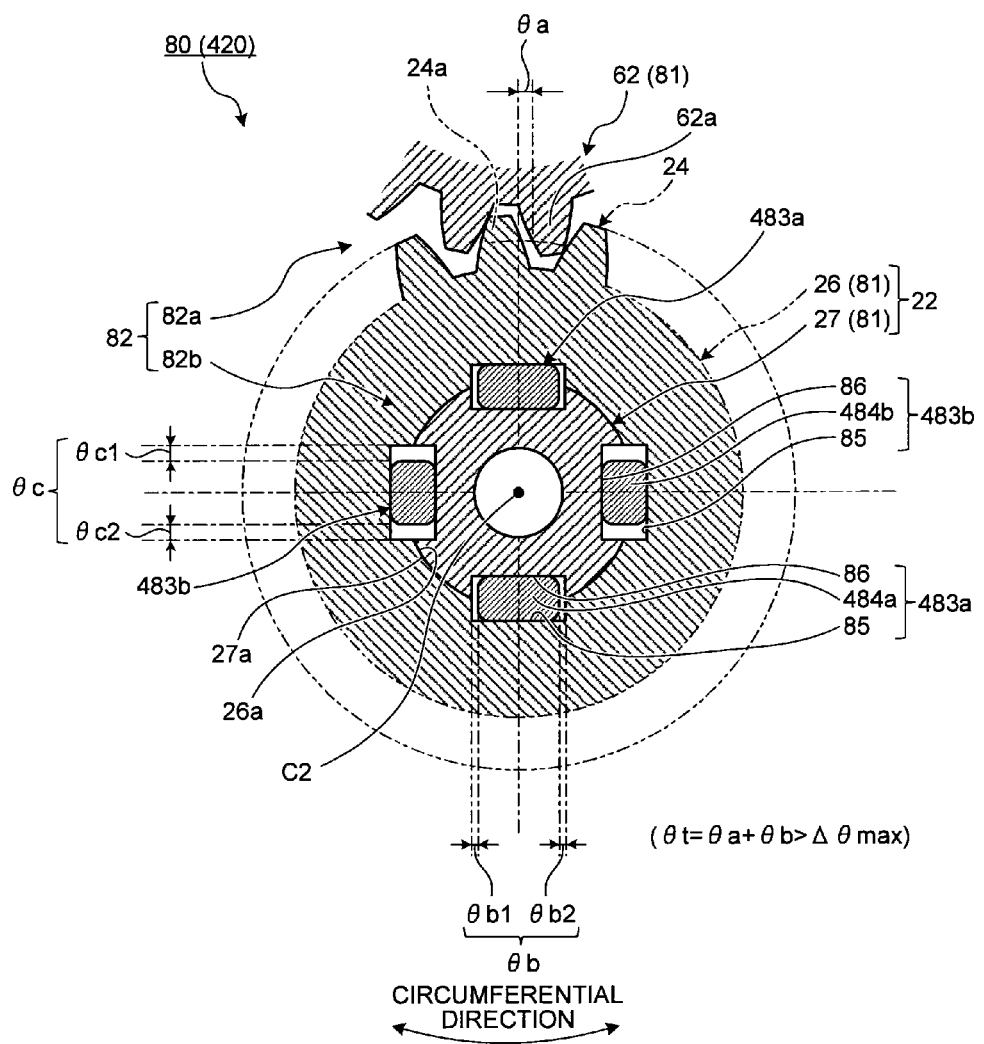
FIG. 12 is a sectional view of a power transmission device according to a fourth embodiment along a radial direction in a periphery of a clearance forming section.

FIG. 12 is a sectional view of a power transmission device according to a fourth embodiment along a radial direction in a periphery of a clearance forming section. The power transmission device according to the fourth embodiment is different from the power transmission device according to first embodiment in that the clearance forming section has plural vibration absorbing members.

A power transmission device 420 of the exemplary embodiment illustrated in FIG. 12 includes clearance forming sections 483a and clearance forming sections 483b to a fitting section 82b. The clearance forming sections 483a and the clearance forming sections 483b are alternately disposed in a circumferential direction and each two sets of them are disposed here. The clearance forming sections 483a and the clearance forming sections 483b have an approximately similar configuration except that a material which constitutes key members 484a, 484b and a size of the key members 484a, 484b are different.

Specifically, the key members 484a and the key members 484b are vibration absorbing members disposed between the intermediate rotating shaft 26 and the motor side rotating shaft 27 together in a rotating direction. The key members 484a and the key members 484b are formed of a material having a different elastic modulus. Here, the key members 484a are composed of a member having an elastic modulus lower than an elastic modulus of a member of the key members 484b. Here, key members 484a are, for example, rubber members, and the key members 484b are aluminum members.

A rotating direction clearance θb of the exemplary embodiment is a total of a clearance θb1 of the key member 484a on one side and a clearance θb2 of the key member 484a on the other side in a rotating direction. Here, in a size relation between the key member 484a and the key member 484b, the key member 484a and the key member 484b are formed such that a length of the key member 484a along a tangential line in the rotating direction (circumferential direction) becomes longer than a length of the key member 484b along a tangential line in the rotating direction. Accordingly, a rotating direction clearance θc, which is a total of a clearance θc1 of the key member 484b on one side and the clearance θc2 of the key member 484b on the other side, is formed as a clearance larger than the rotating direction clearance θb. With the configuration, the clearance forming sections 483a, 483b can be configured so that, as a relative angle between the intermediate rotating shaft 26 and the motor side rotating shaft 27 increases, the key members 484a, which are the vibration absorbing members having a low elastic modulus, are exerted to the intermediate rotating shaft 26 and the motor side rotating shaft 27 prior to the key members 484b which are the vibration absorbing members having a high elastic modulus.

The power transmission device 420 configured as described above can obtain approximately similar characteristics as those described above and illustrated in FIG. 11. That is, when a relative displacement angle between the counter driven gear 62 and the motor side rotating shaft 27 in the rotating direction is in a relative displacement angle region A in response a play θt which is a total of the rotating direction clearance θb and a backlash θa, the relative displacement between the counter driven gear 62 and the motor side rotating shaft 27 in the rotating direction is absorbed by a play θt in the engagement section 82. When the relative displacement angle between the counter driven gear 62 and the motor side rotating shaft 27 in the rotating direction is in a region outside of the relative displacement angle region A as well as in a region inside of a relative displacement angle region C in response to a play of a total of the rotating direction clearance θc and the backlash θa, first, the key member 484a and the intermediate rotating shaft 26, the motor side rotating shaft 27 are abutted, and power is mutually transmitted between the intermediate rotating shaft 26 and the motor side rotating shaft 27 via the key member 484a. When the relative displacement angle between the counter driven gear 62 and the motor side rotating shaft 27 in the rotating direction is outside of the relative displacement angle region C, the key members 484b and the intermediate rotating shaft 26, the motor side rotating shaft 27 are abutted, and power is mutually transmitted between the intermediate rotating shaft 26 and the motor side rotating shaft 27 via the key members 484b.

As described above, since the power transmission device 420 can change a degree of suppression of a shock and noise, when a backlash in the play θt disposed to the transmission mechanism 80 is reduced, at plural stages as the relative angle between the intermediate rotating shaft 26 and the motor side rotating shaft 27 increases, the power transmission device 420 can more minutely and appropriately set shock absorption characteristics and for example, can appropriately achieve a suppression of shock when the play of the rotating direction clearance θb is reduced and a suppression of deterioration of power transmission efficiency at the same time.

According to the power transmission device 420 according to the exemplary embodiment of the present invention explained above, the clearance forming sections 483a, 483b have the key members 484a, 484b as the vibration absorbing members disposed between the intermediate rotating shaft 26 and the motor side rotating shaft 27 in the rotating direction. Accordingly, the power transmission device 420 can suppress a shock and noise when the backlash in the play θt disposed to the transmission mechanism 80 is reduced by the key members 484a, 484b and, for example, can smoothly connect a transient state from a non-driven state to a driven state of the motor MG2, and thereby can secure a comfortable travel feeling.

Note that the power transmission device according to the exemplary embodiment of the present invention described above is not restricted to the exemplary embodiments described above and can be variously changed within a scope according to claims. The power transmission device according to the exemplary embodiments of the present invention may be configured by combining plural exemplary embodiments explained above.

In the power transmission devices explained above, one clearance forming section may have plural vibration absorbing members having a different elastic modulus as explained in the third embodiment, and plural clearance forming sections may have a vibration absorbing member having a different elastic modulus as explained in the fourth embodiment.

Figure 13:
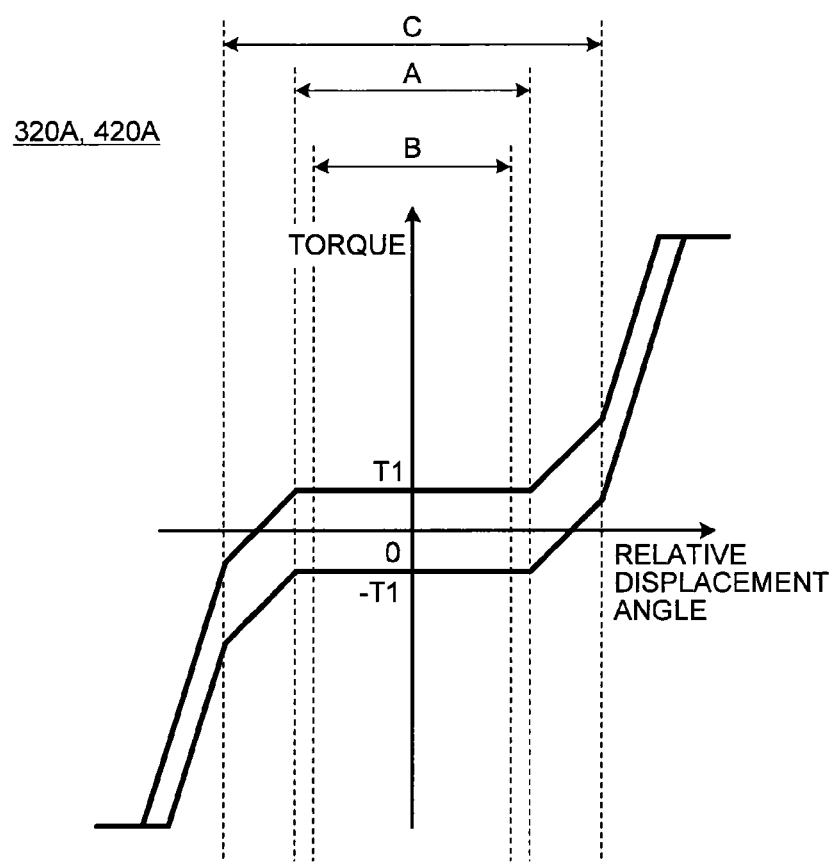
FIG. 13 is a graph explaining operations of power transmission devices according to a modification.

Further, the power transmission device 320 and the power transmission device 420 explained above may have the resistance applying mechanism 290 explained in the second embodiment (refer to FIG. 7). FIG. 13 is a graph explaining operations of power transmission devices 320A, 420A according to a modification, and, in the case, the power transmission devices 320A, 420A can obtain characteristics as illustrated in the drawing.

Figure 14:
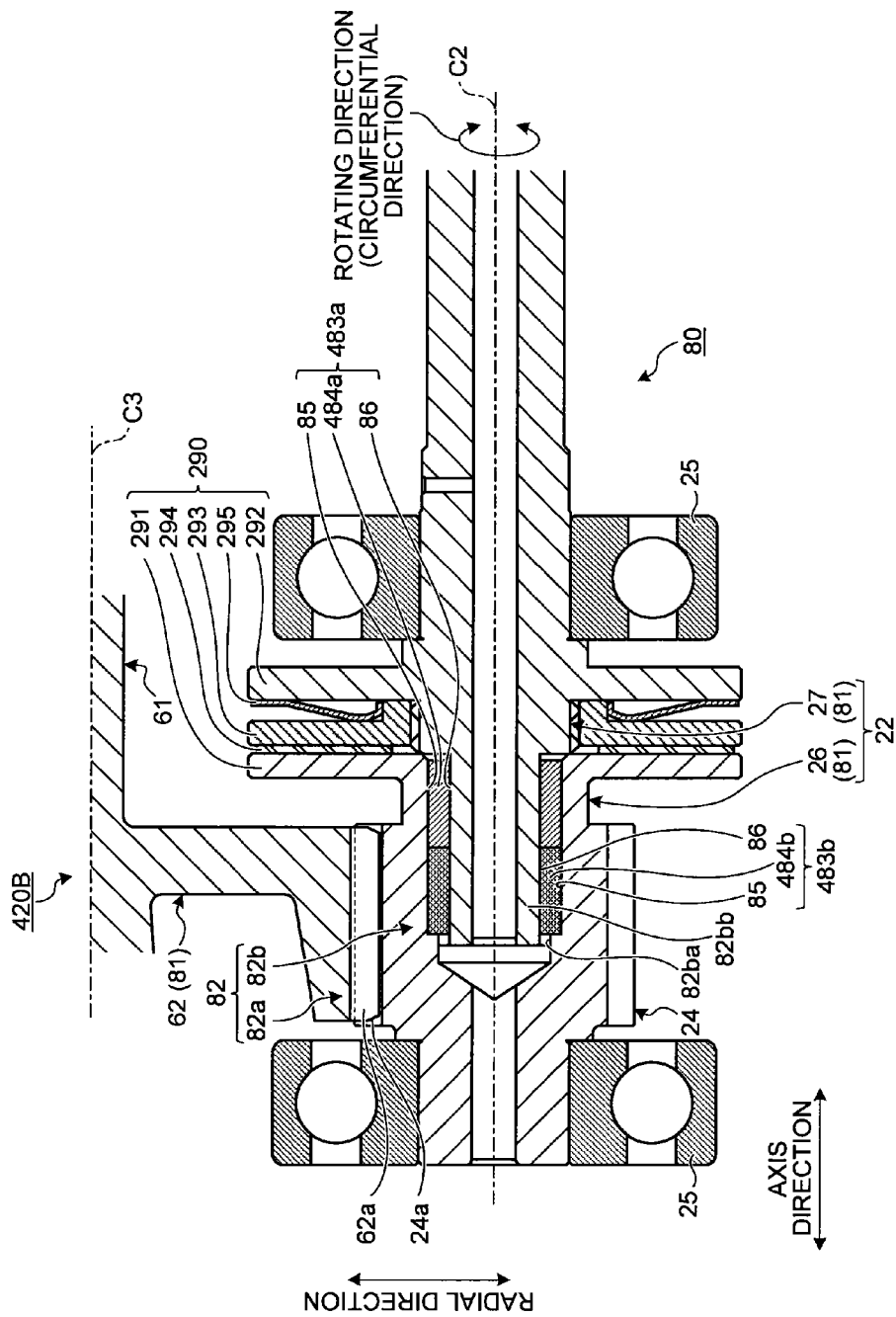
FIG. 14 is a partial sectional view illustrating a schematic configuration of a power transmission device according to a modification in a periphery of a clearance forming section.

FIG. 14 is a partial sectional view illustrating a schematic configuration of a power transmission device 420B according to a modification in a periphery of a clearance forming section. The power transmission device 420 of the fourth embodiment explained above is assuming that the key members 484a having the low elastic modulus and the key members 484b having the high elastic modulus are alternately disposed along the circumferential direction, the power transmission device 420 is not limited thereto. The key members 484a having the low elastic modulus and the key members 484b having the high elastic modulus, in other words, the clearance forming sections 483a and the clearance forming sections 483b may be configured so as to be disposed at positions which are offset in an axis direction of a rotation axis line C2 as in the power transmission device 420B according to the modification, and in the case, a size in a radial direction can be relatively suppressed.

INDUSTRIAL APPLICABILITY

As described above, the power transmission devices according to the present invention are preferably applied to various power transmission devices which are applied to a hybrid vehicle and the like having both an internal combustion engine and a motor as power sources for travelling.

REFERENCE SIGNS LIST

1 VEHICLE
10 INTERNAL COMBUSTION ENGINE
20, 220, 320, 320A, 420, 420A, 420B POWER TRANSMISSION DEVICE
24 SECOND COUNTER DRIVE GEAR (SECOND GEAR)
26 INTERMEDIATE ROTATING SHAFT (INTERMEDIATE ROTATING MEMBER)
27 MOTOR SIDE ROTATING SHAFT (MOTOR SIDE ROTATING MEMBER)
40 ECU (CONTROL DEVICE)
61 COUNTER SHAFT (OUTPUT SHAFT)
62 COUNTER DRIVEN GEAR (FIRST GEAR)
80 TRANSMISSION MECHANISM
81 ROTATING MEMBER
82 ENGAGING SECTION
82a MESH SECTION
82b FITTING SECTION
83, 383, 483a, 483b CLEARANCE FORMING SECTION
84 KEY MEMBER
85, 86 ACCOMMODATING SECTION
290 RESISTANCE APPLYING MECHANISM
384 VIBRATION ABSORBING MEMBER 387, 388 FIRST VIBRATION ABSORBING MEMBER
389 SECOND VIBRATION ABSORBING MEMBER
484a, 484b KEY MEMBER (VIBRATION ABSORBING MEMBER)
MG1 MOTOR
MG2 MOTOR (ELECTRIC MOTOR)
$\Delta\theta$max MAXIMUM RELATIVE DISPLACEMENT AMOUNT
$\theta$a BACKLASH
$\theta$b ROTATING DIRECTION CLEARANCE
$\theta$t PLAY

The invention claimed is:

1. A power transmission device comprising:
a transmission mechanism configured to transmit power generated by a first electric motor to an output shaft, to which power generated by an internal combustion engine is transmitted, via engaging sections of a plurality of rotating members, wherein
the transmission mechanism has a play to the engaging sections along a rotating direction of the rotating members, the play being larger than a relative displacement amount between a rotating member on the internal combustion engine side and a rotating member on the first electric motor side at a time that a rotation variation phase difference between the internal combustion engine and the first electric motor is maximum,
the transmission mechanism is configured to include, as the plurality of the rotating members, a first gear disposed on the output shaft and to which power generated by the internal combustion engine is transmitted, an intermediate rotating member disposed with a second gear that is meshed with the first gear and capable of transmitting power generated by the first electric motor to the first gear, and an electric motor side rotating member disposed between the intermediate rotating member and the first electric motor, the play is a total clearance of a backlash formed to the engaging section of the first gear and the second gear, and a rotating direction clearance along the rotating direction formed by a clearance forming section disposed to the engaging section of the intermediate rotating member and the electric motor side rotating member,
the clearance forming section includes a first accommodating section provided on an inner peripheral surface of the intermediate rotating member, a second accommodating section provided on an outer peripheral surface of the electric motor side rotating member, and a key member interposed in the first and second accommodating sections, the rotating direction clearance being a total clearance in the rotating direction between sides of the key member and sides of the first and second accommodating sections, and
a control device configured to control the first electric motor and generate minute control torque for rotating the first electric motor in synchronization with the output shaft, when a vehicle, on which the first electric motor and the internal combustion engine are mounted as power sources for travelling, is driven without depending on power of the first electric motor.

2. The power transmission device according to claim 1 further comprising:
a resistance applying mechanism configured to apply a resistance to the intermediate rotating member along the rotating direction.

3. The power transmission device according to claim 2, wherein the clearance forming section includes a vibration absorbing member disposed between the intermediate rotating member and the electric motor side rotating member in the rotating direction.

4. The power transmission device according to claim 2, wherein an inertial mass of the intermediate rotating member is smaller than an inertial mass of the electric motor side rotating member.

5. The power transmission device according to claim 1, wherein the clearance forming section includes a vibration absorbing member disposed between the intermediate rotating member and the electric motor side rotating member in the rotating direction.

6. The power transmission device according to claim 5, wherein the vibration absorbing member includes a plurality of the vibration absorbing members having a different elastic modulus.

7. The power transmission device according to claim 6, wherein the plurality of the vibration absorbing members are configured such that, as a relative angle between the intermediate rotating member and the electric motor side rotating member increases, the vibration absorbing member having a low elastic modulus is exerted to the intermediate rotating member and the electric motor side rotating member prior to the vibration absorbing member having a high elastic modulus.

8. The power transmission device according to claim 7, wherein an inertial mass of the intermediate rotating member is smaller than an inertial mass of the electric motor side rotating member.

9. The power transmission device according to claim 6, wherein an inertial mass of the intermediate rotating member is smaller than an inertial mass of the electric motor side rotating member.

10. The power transmission device according to claim 5, wherein an inertial mass of the intermediate rotating member is smaller than an inertial mass of the electric motor side rotating member.

11. The power transmission device according to claim 1, wherein an inertial mass of the intermediate rotating member is smaller than an inertial mass of the electric motor side rotating member.

12. The power transmission device according to claim 1, wherein the engaging section of the intermediate rotating member and the electric motor side rotating member includes a fitting concave section disposed on an end of the intermediate rotating member and a fitting convex section disposed on an end of the electric motor side rotating member, and
wherein the first accommodating section is formed to an inner peripheral surface of the fitting concave section, and the second accommodating section is formed to an outer peripheral surface of the fitting convex section.

* * * * *